United States Patent [19]
Eleftheriadis et al.

[11] Patent Number: 6,092,107
[45] Date of Patent: *Jul. 18, 2000

[54] SYSTEM AND METHOD FOR INTERFACING MPEG-CODED AUDIOVISUAL OBJECTS PERMITTING ADAPTIVE CONTROL

[75] Inventors: Alexandros Eleftheriadis; Yihan Fang; Hari Kalva, all of New York; Atul Puri, Riverdale, all of N.Y.; Robert Lewis Schmidt, Howell, N.J.

[73] Assignees: AT&T Corp; Columbia University, both of New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/055,934

[22] Filed: Apr. 7, 1998

Related U.S. Application Data

[60] Provisional application No. 60/042,798, Apr. 7, 1997.

[51] Int. Cl.[7] ............................... H04N 7/10; H04H 1/02
[52] U.S. Cl. ............................... 709/217; 348/10; 455/6.2
[58] Field of Search ..................................... 709/217–219; 345/327; 348/6, 7, 10, 12, 13, 725–728; 455/3.1–6.3; 370/536, 542

[56] References Cited

U.S. PATENT DOCUMENTS

| | | | |
|---|---|---|---|
| 5,563,648 | 10/1996 | Menand et al. | 348/13 |
| 5,596,565 | 1/1997 | Yonemitsu et al. | 369/275.3 |
| 5,754,242 | 5/1998 | Ohkami | 348/441 |
| 5,794,250 | 8/1998 | Cariño , Jr. et al. | 707/104 |

OTHER PUBLICATIONS

J. Laier et al., "Content–Based Multimedia Data Access in Internet Video Communication", *First International Workshop on Wireless Image/Video Communications*, Sep. 1996, pp. 126–133.

A. Eleftheriadis et al., "Stored File Format for Object–based Audio Visual Representation", pp. 1–8.

A. Basso et al., "Improved Data Access and Streaming Modes for the MPEG–4 File Format", pp. 1–12.

J. Heid, "Watch This: Streaming Video on Your Web Site", *create WEB*, Apr. 1998, pp. 109–112.

A. Griffin, "Video on the Net", *Popular Mechanics*, Mar. 1998, pp. 51–53.

L. Chiariglione, "MPEG and Multimedia Communications", *IEEE Transactions on Circuits and Systems for Video Technology*, vol. 7, No. 1, Feb. 1997, pp. 5–18.

(List continued on next page.)

*Primary Examiner*—John W. Miller

[57] ABSTRACT

The invention provides a system and method allowing the adaptation of a nonadaptive system for playing/browsing coded audiovisual objects, such as the parametric system of MPEG-4. The system of the invention is referred to as the programmatic system, and incorporates adaptivity on top of the parametric system. The parametric system of MPEG-4 consists of a Systems Demultiplex (Demux) overseen by digital media integration framework (DMIF), scene graph and media decoders, buffers, compositer and renderer. Adaptations possible with the invention include interfaces in the categories of media decoding, user functionalities and authoring, thus allowing a number of enhanced functionalities in response to use input as well as graceful degradation in response to limited system resources. The invention includes a specification of an interfacing method in the form of an application programming interface (API). Hot object, directional, trick mode, transparency and other interfaces are specified.

20 Claims, 4 Drawing Sheets

OTHER PUBLICATIONS

A. Eleftheriadis et al., "Stored File Format for MPEG–4", *International Organization for Standardization*, ISO/IEC JTC1/SC29/WG11 MPEG97/M2062, Apr. 1, 1997, pp. 1–4.

Y. Fang et al., "Adding Bitstream Input/Output Library in Java", *International Organization for Standardization*, ISO/IEC JTC1/SC29/WG11 MPEG97/M2063, Apr. 1, 1997. pp. 1–6.

A Basso et al., "MPEG–4 Integrated Intermedia Format (IIF): Basic Specification", *International Organization for Standardization*, ISO/IEC JTC1/SC29/WG11 MPEG98/M2978, Jan. 16, 1998, pp. 1–22.

Olivier Avaro et al., "The MPEG–4 Systems and Description Languages: A Way Ahead in Audio Visual Information Representation," *Signal Processing: Image Communication*, 9 (1997) pp. 385–431.

Peter K. Doenges et al., "Audio/Video and Synthetic Graphics/Audio for Mixed Media," *Signal Processing: Image Communication*, 9 (1996), pp. 433–463.

Fernando Pereira et al., "Very Low Bit–Rate Audio–Visual Application," *Signal Processing: Image Communication*, 9 (1996) 55–77.

SYSTEM AND METHOD FOR INTERFACING MPEG-CODED AUDIOVISUAL OBJECTS PERMITTING ADAPTIVE CONTROL

CROSS-REFERENCE TO RELATED APPLICATION

This application is related to U.S. Provisional Application Ser. No. 60/042,798 from which priority is claimed.

BACKGROUND OF THE INVENTION

1. Field of Invention

The invention relates to the field of coded multimedia and its storage and delivery to users, and more particularly to such coding when either the channel and decoding resources may be limited and time varying, or user applications require advanced interaction with coded multimedia objects.

2. Description of Related Art

Digital multimedia offers advantages including manipulation, multigeneration processing, error robustness and others, but incurs constraints due to the storage capacity or transmission bandwidth required, and thus frequently requires compression or coding for practical applications. Further, in the wake of rapid increases in demand for digital multimedia over the Internet and other networks, the need for efficient storage, networked access, search and retrieval, a number of coding schemes, storage formats, retrieval techniques and transmission protocols have evolved. For instance, for image and graphics files, GIF, TIF and other formats have been used. Similarly, audio files have been coded and stored in RealAudio, WAV, MIDI and other formats. Animations and video files have often been stored using GIF89a, Cinepak, Indeo and others.

To play back the plethora of existing formats, decoders and interpreters are often needed and may offer various degrees of speed and quality performance depending on whether these decoders and interpreters are implemented in hardware or in software, and particularly in the case of software, on the capabilities of the host computer. If such content is embedded in web pages accessed via a computer (e.g. a PC), the web browser needs to be set up correctly for all the anticipated content and recognize each type of content and support a mechanism of content handlers (software plugins or hardware) to deal with such content.

The need for interoperability, guaranteed quality and performance and economies of scale in chip design, as well as the cost involved in content generation for a multiplicity of formats has lead to advances in standardization in the areas of multimedia coding, packetization and robust delivery. In particular, ISO MPEG (International Standards Organization Motion Picture Experts Group) has standardized bitstream syntax and decoding semantics for coded multimedia in the form of two standards referred to as MPEG-1 and MPEG-2. MPEG-1 was primarily intended for use on digital storage media (DSM) such as compact disks (CDs), whereas MPEG-2 was primarily intended for use in a broadcast environment (transport stream), although it also supports an MPEG-1 like mechanism for use on DSM (program stream). MPEG-2 also included additional features such as DSM Command and Control for basic user interaction as may be needed for standardized playback of MPEG-2, either standalone or networked.

With the advent of inexpensive boards/PCMCIA cards and with availability of Central Processing Units (CPUs), the MPEG-1 standard is becoming commonly available for playback of movies and games on PCs. The MPEG-2 standard on the other hand, since it addresses relatively higher quality applications, is becoming common for entertainment applications via digital satellite TV, digital cable and Digital Versatile Disk (DVD). Besides the applications and platforms noted, MPEG-1 and MPEG-2 are expected to be utilized in various other configurations, in streams communicated over network and streams stored over hard disks/CDs, as well as in the combination of networked and local access.

The success of MPEG-1 and MPEG-2, the bandwidth limitation of Internet and mobile channels, the flexibility of web-based data access using browsers, and the increasing need for interactive personal communication has opened up new paradigms for multimedia usage and control. In response, ISO-MPEG started work on a new standard, MPEG-4. The MPEG-4 standard has addressed coding of audio-visual information in the form of individual objects and a system for composition and synchronized playback of these objects. While the MPEG-4 development of such a fixed parametric system continues, in the meantime, new paradigms in communication, software and networking such as that offered by the Java language have offered new opportunities for flexibility, adaptivity and user interaction.

For instance, the advent of the Java language offers networking and platform independence critical to downloading and executing of applets (java classes) on a client PC from a web server which hosts the web pages visited by the user. Depending on the design of the applet, either a single access to the data stored on the server may be needed and all the necessary data may be stored on the client PC, or several partial accesses (to reduce storage space and time needed for startup) may be needed. The latter scenario is referred to as streamed playback.

As noted, when coded multimedia is used for Internet and local networked applications on a computer like a PC, a number of situations may arise. First, the bandwidth for networked access of multimedia may be either limited or time-varying, necessitating transmission of the most significant information only and followed by other information as more bandwidth becomes available.

Second, regardless of the bandwidth available, the client side PC on which decoding may have to take place may be limited in CPU and/or memory resources, and furthermore, these resources may be time-varying. Third, a multimedia user (consumer) may require highly interactive nonlinear browsing and playback; this is not unusual, since a lot of textual content on web pages is capable of being browsed using hyperlinked features and the same paradigm is expected for presentations employing coded audio-visual objects. The parametric MPEG-4 system may only be able to deal with the aforementioned situations in a very limited way, such as by dropping objects or temporal occurrences of objects it is incapable of decoding or presenting, resulting in choppy audio-visual presentations. Further, MPEG-4 may not offer any sophisticated control by the user of those kinds of situations. To get around such limitations of the parametric system, one potential option for MPEG-4 development is in a programmatic system.

The use of application programming interfaces (APIs) has been long recognized in the software industry as a means to achieve standardized operations and functions over a number of different types of computer platforms. Typically, although operations can be standardized via definition of the API, the performance of these operations may still differ on various platforms as specific vendors with interest in a specific platform may provide implementations optimized for that platform. In the field of graphics, Virtual Reality Modeling Language (VRML) allows a means of specifying spatial and temporal relationships between objects and description of a scene by use of a scene graph approach. MPEG-4 has used a binary representation (BIFS) of the constructs central to VRML and extended VRML in many ways to handle real-time audio/video data and facial/body animation. To enhance features of VRML and to allow programmatic control, DimensionX has released a set of APIs known as Liquid Reality. Recently, Sun Microsystems has announced an early version of Java3D, an API specification which among other things supports representation of synthetic audiovisual objects as scene graph. Sun Microsystems has also released Java Media Framework Player API, a framework for multimedia playback. However, none of the currently available API packages offer a comprehensive and robust feature set tailed to the demands of MPEG-4 coding and other advanced multimedia content.

SUMMARY OF THE INVENTION

The invention provides a system and method for interfacing coded auidovisual objects, allowing a nonadaptive client system, such as the parametric MPEG-4 system, to play and browse coded audiovisual objects in adaptive fashion. The system and method of the invention is programmatic at an architectural level, and adds a layer of adaptivity on top of the parametric system by virtue of a defined set of application programming interfaces specifically configured to access and process MPEG-4 coded data.

MPEG-4, familiar to persons skilled in the art, can be considered a parametric system consisting of a Systems Demultiplex (Demux) overseen by digital media integration framework (DMIF), scene graph and media decoders, buffers, compositor and renderer. Enhancements or extensions offered by the system and method of the invention to standard MPEG-4 include a set of defined APIs in the categories of media decoding, user functionalities and authoring which client applications can invoke. By providing this powerful audiovisual interface facility, the invention allows a number of enhanced realtime and other functions in response to user input, as well as graceful degradation in the face of limited system resources available to MPEG-4 clients.

The invention is motivated in part by the desirability of standardized interfaces for MPEG-4 playback and browsing under user control, as well as effective response to time-varying local and networked resources. Interfaces specified in the invention are intended to facilitate adaptation of coded media data to immediately available terminal resources. The specified interfaces also facilitate interactivity expected to be sought by users, either directly as a functionality or indirectly embedded in audiovisual applications and services expected to be important in the future.

The invention specifies an interfacing method in the form of a robust application programming interface (API) specification including several categories. In the category of media decoding, a visual decoding interface is specified. In the category of user functionality, progressive, hot object, directional, trick mode and transparency interfaces are specified. In the category of user authoring, a stream editing interface is specified. The overall set of interfaces, although not an exhaustive set, facilitates a substantial degree of adaptivity.

BRIEF DESCRIPTION OF THE DRAWINGS

The invention will be described with reference to the accompanying drawings, in which like elements are designated by like numbers and in which.

DETAILED DESCRIPTION OF PREFERRED EMBODIMENTS

The system of method of the invention will be described in the environment of MPEG-4 decoding, in which environment the invention specifies not a single API but a collection of APIs that address various interfaces for an extended MPEG4 system. The Java language, familiar to persons skilled in the art, is used for specification of the APIs, and is executed on general or special purpose processors with associated electronic memory, storage, buses and related components familiar to persons skilled in the art. In the invention three categories of API are illustratively identified, and representative functions in each category are provided.

The three illustrative API categories are as follows:

Media Decoding
User Functionality
Authoring

The specific APIs presented by the invention as well as a way of organizing the implementations of such APIs are first summarized in the following table, and described below.

TABLE 1

APIs of invention

| API Category and No specifics | Explanation |
|---|---|
| Media Decoding | |
| 1. Visual Decoding | Decoding of visual objects with or without scalability from a coded bitstream |

TABLE 1-continued

APIs of invention

| API Category and No specifics | Explanation |
|---|---|
| Functionality | |
| 2. Progressive | Progressive decoding and composition of an AV object under user control |
| 3. Hot Object | |
| 4. Directional | Decoding, enhancement and composition of an AV object based on user control |
| 5. Trick Mode | Decoding of AV object with viewpoint (or accoustic) directionality selected by used |
| 6. Transparency | Decoding of portions of AV object and composition of an AV object under user control Decoding, refinement and composition of an AV object based on transparency and user control |
| Partial Authoring | |
| 7. Stream Editing | Editing of MPEG-4 bitstream to modify content without decoding and reencoding |

Packages are a means to organize the implementation of APIs. Taking into account the library of APIs presented by the invention, a partial list of packages follows.

mpgj.dec

This package contains classes for user functionalities including interaction.

mpgj.func

This package contains classes for user functionalities including preferences.

mpgj.util

This package contains classes that provide interfaces to various input, output, sound and video devices.

The system and method of the invention as well as the associated interface methods (APIs) will now be described.

Figure 1:
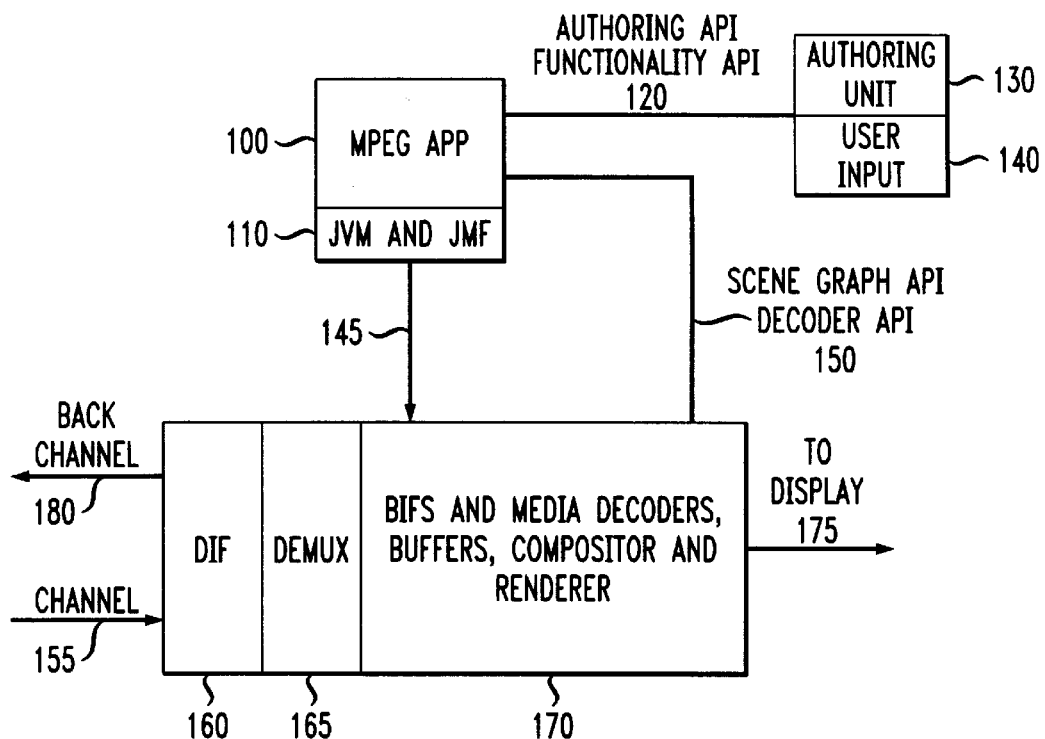
FIG. 1 illustrates a high level block diagram of the system illustrating an embodiment of the invention.

FIG. 1 illustrates a high level block diagram of a system implementation of the invention. The implementation consists of two major components. The first is the known parametric system which consists of Digital Media Integration Framework (DMIF) 160, providing delivery interface to the channel 155, and connecting to the Systems Demux 165, the output of which goes through a sequence of blocks, represented for simplicity as an aggregated block: BIFS and Media Decoders, Buffers, Compositor and Renderer 170, the output of which on line 175 is presented to Display. The second major component consists of an MPEG Application/Applet (MPEG App) 100, which interfaces to the external Authoring Unit 130, and User Input respectively via 120, the Authoring API and Functionality API of the invention. Further, the Java Virtual Machine and Java Media Framework (JVM and JMF) 110 are used as the underlying basis to connect to BIFS and Media Decoders, Buffers, Compositor and Renderer 170, as well as directly interfaces to BIFS and Media Decoders, Buffers, Compositor and Renderer 170, via the Scene Graph API 150 (provided by MPEG and used in the invention) and the Decoder API.

Figure 2:
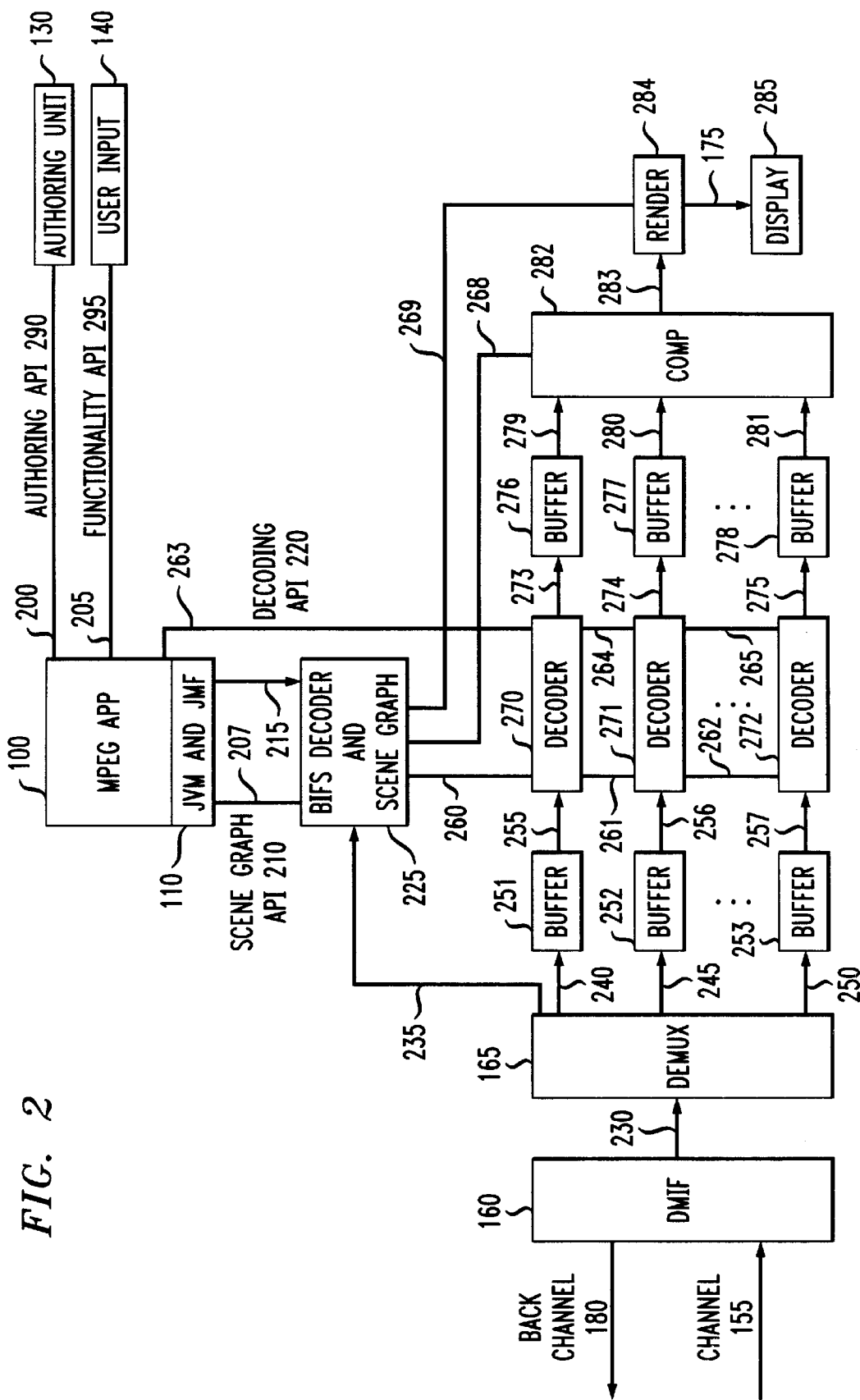
FIG. 2 illustrates a block diagram of the system with illustrating details of the embodiment of the invention.

FIG. 2 illustrates in greater detail the various blocks, components and interfaces of FIG. 1. The Authoring Unit 130 is shown interfacing on line 200 to MPEG App 100, separately from the User Input 140 which interfaces via line 205. The respective interfaces, Authoring API 290 as well as Functionality API 295, are also shown. In addition, MPEG App 100, and the underlying JVM and JMF 110, are shown acting upon BIFS Decoder and Scene Graph 225 via line 215, as well as interfacing via 207 to Scene Graph API, 210. The BIFS Decoder and Scene Graph 225 controls instantiation of a number of media decoders, 270, 271, 272 via lines 260, 261, 262, and also controls (via lines 268 and 269) the Compositor 282 and the Renderer 284. The JVM and JMF 110, associated with MPEG App 100, can also control media decoders 270, 271 and 272 via respective lines 263, 264, 265. For FIG. 2, up to now, the various programmatic controls and interfaces have been discussed.

The remaining portion of FIG. 2 provides details of the MPEG-4 parametric system, on top of which the operation of the programmatic system and method of the invention will now be examined. An MPEG-4 system bitstream to be decoded arrives via channel 155 to the network/storage delivery interface DMIF 160, which passes this over line 230 to the DeMux 165. The depacketized and separated bitstream consists of portions that contain the scene description information and are sent to BIFS Decoder and Scene Graph 225. The bitstream also contains other portions intended for each of the various media decoders and pass respectively through lines 240, 245 and 250, decoding Buffers, 251, 252 and 253, lines 255, 256, and 257, to arrive at media decoders 270, 271 and 272 which output the decoded media on lines 273, 274 and 275 which form input to composition Buffers 276, 277 and 278. The output of Buffer 276 on line 279 passes to the compositor along with output of Buffer 277 on line 280 and the output of Buffer 278 on line 281.

Although only three sets of media decoding operations are shown (via decoding Buffers 251, 252, 253, Decoders 270, 271, 272, and composition Buffers 276, 277, 278), in practice the number of media decoders may be as few as one, or as many as needed. The Compositor 282 positions the decoded media relative to each other based on BIFS Scene Graph (and possibly user input) and composes the scene, and this information is conveyed via line 283 to the Renderer 284. Renderer 284 renders the pixels and audio samples and sends them via line 175 to a display (with speakers, not shown) 285.

Figure 3:
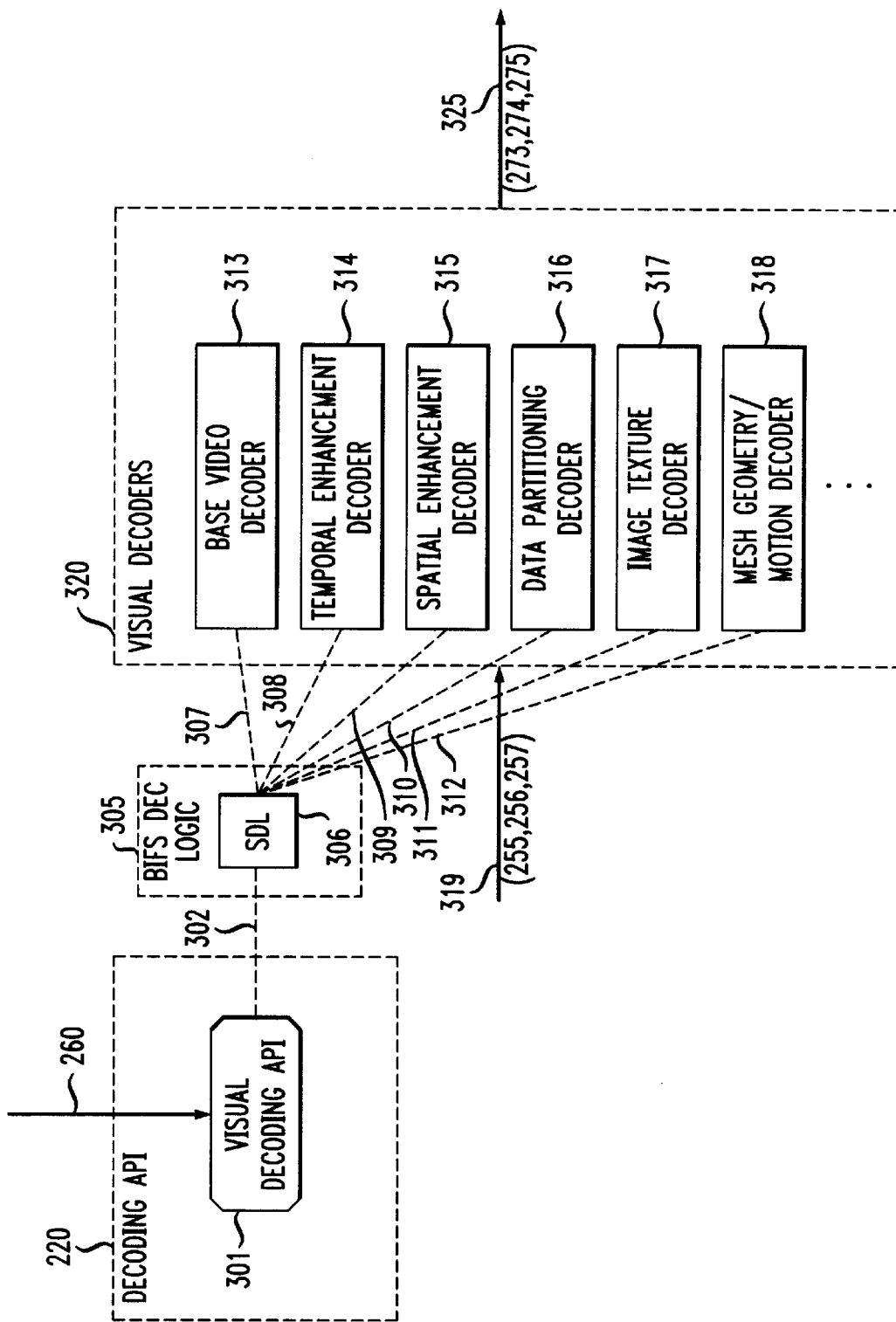
FIG. 3 illustrates an interface method for visual decoding according to the invention.

FIG. 3 illustrates the media decoding aspect of the invention using visual decoding as the specific example. For simplicity, media decoding is referred to simply as decoding. Some assumptions are necessary regarding the availability of BaseAVObject or VideoDecoder constructs; these assumptions are typical of the situation in object oriented programming where such abstract classes containing default or placeholder operations are often extended by overriding its constructs.

The Decoding API 220 represents an interface, more specifically, the Visual Decoding API 301. Using the Visual Decoding API 301 it is possible to instantiate a number of different Visual Decoders 320. The instantiation can be thought of as a control via the block Selective Decode Logic (SDL) 306, which is shown to belong along with other pieces of logic to BIFS Dec(oder) Logic 305, a portion or component of the BIFS Decoder and Scene Graph 225. The BIFS Dec Logic 305 exerts control on various visual decoders, such as the Base Video Decoder 313, via control line 307, the Temporal Enhancement Decoder 314 via control line 308, the Spatial Enhancement Decoder 315 via control line 309, the Data Partitioning Decoder 316 via control line 310, the Image Texture Decoder 317 via control line 311, the Mesh Geometry/Motion Decoder 318 via line 312 and so forth. The bitstream to be decoded is applied via line 319 (which corresponds to media decoder input of 255 or 256 or 257 in FIG. 2) to the appropriate decoder and the decoded output is available on line 325 (which corresponds to media decoder output of 273 or 274 or 275 in FIG. 2). The Base Video Decoder 313 decodes the nonscalable video, the Spatial Enhancement Decoder 315 decodes the spatial scalability video layer/s, the Temporal Enhancement Decoder 314 decodes the temporal scalability video layer/s, the Data Partitioning Decoder 316 decodes the data partitioned video layer/s, the Image Texture Decoder 317 decodes the spatial/SNR scalable layers of still image texture, and the Mesh Geometry/Motion Decoder 318 decodes the wireframe mesh node location and movement of these nodes with the movement of the object. Such decoders are specified by the MPEG-4 visual standard known in the art. Details of this category of API presented by the invention used to access the MPEG-4 visual decoders in a flexible and consistent manner will now be described.

Decoding API
Class mpgj.dec.BaseAVObject
public class BaseAVObject
This is a basic class allowing decoding of base AV object stream.
Constructors
public BaseAVObject ()
Methods
public void startDec ()
Start decoding of data.
public void stopDec ()
Stop decoding of data.
public void attachDecoder (Mp4Stream basestrm)
Attach a decoder to basestrm in preparation to decode a valid MPEG-4 stream to whose decoding is to take place.
Visual Decoding API
Class mpgi.dec.Mp4VDecoder
public class Mp4VDecoder
extends VideoDecoder
This class extends VideoDecoder, an abstract class (not shown). It contains methods to decode various types of visual bitstreams.
Constructors
public Mp4VDecoder()
Methods
public VObject baseDecode(Mp4Stream basestrm)
Decodes a base MPEG-4 video stream, basestrm, and returns a decoded visual object ,VObject.
public Vobject sptEnhDecode(Mp4Stream enhstrm)
Decodes a spatial enhancement MPEG-4 video stream, enhstream, and returns a decoded visual object, VObject.
public Vobject tmpEnhDecode(Mp4Stream enhstrm)
Decodes a temporal enhancement MPEG-4 video stream, enhstrm, and returns a decoded visual object, VObject.
public VObject snrEnhDecode(Mp4Stream enhstrm, int level)
Depending on the level, decodes a snr enhancement MPEG-4 video stream, enhstrm and returns a decoded visual object,VObject.
public VObject datapartDecode(Mp4Stream enhstrm, int level)
Depending on the level, decodes a data partitioned MPEG-4 video stream, enhstrm, and returns a decoded visual object, Vobject.
public Vobject trickDecode(Mp4Stream trkstrm, int mode)
Depending on the mode, skip and decode trick stream, trkstrm, and returns a decoded visual object, Vobject.
public MeshObject meshAuxDecode(Mp4Stream auxstrm)
Decodes an MPEG-4 auxiliary video stream, auxstrm, and returns a mesh object, MeshObject, which includes mesh geometry and motion vectors.

Figure 4:
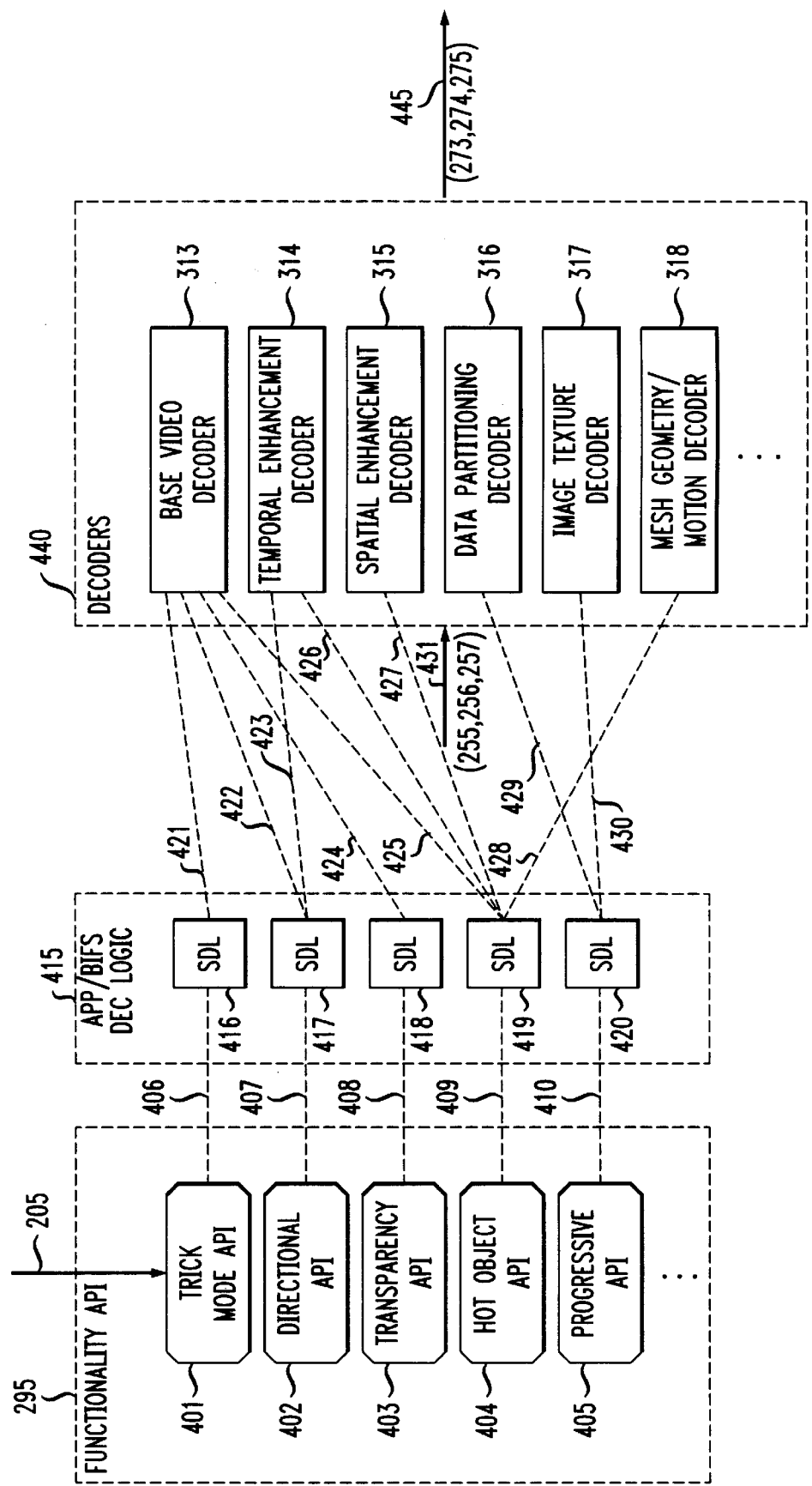
FIG. 4 illustrates an interface method for functionalities according to the invention.

FIG. 4 describes the functionality of certain aspects of the invention using a number of example functionalities for which interfaces are defined in terms of another category of API. The Functionality API 295 represents interfaces, more specifically, for Trick Mode (401), Directional (402), Transparency (403), Hot Object (404) and Progressive (405) functions. Using each of the APIs it is possible to instantiate a number of different decoders; visual decoders are again used as an example. The instantiation can be thought of as a control via several block Selective Decode Logic (SDL), 416, 417, 418, 419, 420, which are shown to belong to APP/BIFS Dec(oder) Logic 415, component of the BIFS Decoder and Scene Graph 225 or/and the MPEG-4 App 100. The APP/BIFS Dec Logic 415 exerts control on various visual decoders, such as the Base Video Decoder 313 via control lines 421, 422, 424, 425, the Temporal Enhancement Decoder 315 via control lines 423 and 426, the Spatial Enhancement Decoder 315 via control line 427, the Data Partitioning Decoder 316 via control line 429, the Image Texture Decoder 317 via control line 430, the Mesh Geometry/Motion Decoder 318 via line 428 and so forth.

The bitstream to be decoded is applied via line 431 (which corresponds to media decoder input of 255 or 256 or 257 in FIG. 2) to the appropriate decoder and the decoded output is available on line 445 (which corresponds to media decoder output of 273 or 274 or 275 in FIG. 2). It is important to realize that often a user functionality relative to visual objects may be realized by use of one or more visual decoders. The SDL is used to not only make a selection between the specific decoder to be instantiated for decoding each visual object, but also, the decoder used for a piece of the bitstream, and the specific times during which it is engaged or disengaged. A number of SDL, 416, 417, 418, 419, 420 are shown, one corresponding to each functionality. Each SDL in this figure has one control input but one of the several potential control outputs. Further, for clarification, as in the case of FIG. 3, the Base Video Decoder 313 decodes the nonscalable video, the Spatial Enhancement Decoder 314 decodes the spatial scalability video layer/s, the Temporal Enhancement Decoder 315 decodes the temporal scalability video layer/s, the Data Partitioning Decoder 316 decodes the data partitioned video layer/s, the Image Texture Decoder 317 decodes the spatial/SNR scalable layers of still image texture, and the Mesh Geometry/Motion Decoder 318 decodes the wireframe mesh node location and movement of these nodes with the movement of the object; such decoders are again specified by the MPEG-4 visual standard. Details of this category of APIs presented by the invention used to achieve these functionalities in a flexible and robust manner will now be described.

Functionality API

The following API address the various user interaction functionality.

Progressive API
Class mpgj.func.ProgAVObject
public class ProgAVObject
extends BaseAVObject A ProgAVObject allows progressive refinement of quality of an AV object under user control. Currently, visual objects are assumed to be static (still image "vops", a Video Object Plane, which is an instance in time of an arbitrarily shaped object; when the shape is rectangular, then a vop is identical to a frame).

Constructors
public ProgAVObject()
Methods
public void startdec ()
Start decoding of data.
public void stopDec ()
Stop decoding of data.
public void pauseDec ()
Temporarily suspend decoding of data.
public void resumeDec ()
Restart decoding of data from current state of pause.
public int selectProgLevel ()
Select level up to which decoding of transform (DCT or wavelet) coefficients will take place. A level constitutes coefficients up to a certain position in scan order.
public void attachdecoder (Mp4Stream srcstrm, int proglvl)
Attach a decoder to srcstrm in preparation to decode a valid MPEG-4 stream and specifies the prog level up to which decoding is to take place
public void offsetStream (Mp4Stream srcstrm, ulong offset)
Allow an offset into the srcstrm as the target where the decoding may start. In practice, the actual target location may be beyond the required target and depends on the location of valid entry point in the stream.

Hot Object/Region API

This API allows interaction with hot (active) AV objects. It may be extended to allow interaction with hot regions within an object. This API is intended to allow one or more advanced functionalities such as spatial resolution enhancement, quality enhancement, temporal quality enhancement of an AV object. The actual enhancement that occurs is dependent on user interaction (via mouse clicks/menu) and the enhancement streams locally/remotely as well as enhancement decoders available.

Class mpgj.func.HotAVObject
public class HotAVObject
extends BaseAVObject

HotAVObject is a class that triggers the action of enhancement of an AVObject provided that the object is a hot object. Thus hot objects have some enhancement streams associated with them that are triggered when needed. This class extends BaseAVObject, which is used primarily to decode base (layer) streams. Further, the definition of hot objects may be extended to include regions of interest (KeyRegions).

Constructors
public HotAVObject()
Methods
public void startDec ()
Start decoding of data.
public void stopDec ()
Stop decoding of data.
public void pauseDec ()
Temporarily suspend decoding of data.
public void resumeDec ()
Restart decoding of data from current state of pause.
public int selectHotType ()
Select type of enhancement (spatial, quality, temporal etc).
public Mp4Stream enhanceObject (int type)
Use selected enhancement type to obtain needed enhancement stream.
public void attachDecoder (Mp4Stream srcstrm, int type)
Attach a decoder to srcstrm in preparation to decode a valid MPEG-4 stream and specifies the type of decoding is to take place
public void offsetstream (Mp4Stream srcstrm, ulong offset)
Allow an offset into the srcstrm as the target where the decoding may start. In reality, the actual target location may be beyond the required target and depends on the location of valid entry point in the stream.

Directional API

This API allows interaction with directionally sensitive AV objects. It supports static visual objects (still vops), dynamic visual objects (moving vops), as well as directional speech and audio. For visual objects it permits a viewpoint to be selected and only the corresponding bitstreams are decoded and decoded data forwarded to compositor. For aural objects an analogous operation takes place depending on desired aural point. At present, predefined directional choices are assumed.

Class mpgj.func.DirecAVObject
public class DirecAVObject
extends BaseAVObject

DirecAVObject is a class that allows creation of objects that respond to x-y-z location in space (in the form of prequantized directions). This class is most easily explained by assuming a bitstream composed of a number of static visual vops coded as an AV object such that depending on the user interaction, vops corresponding to one or more viewpoint are decoded as needed. The class is equally suitable to decoding dynamic AVObjects.

Constructors
public DirecAVObject()
Methods
public void startDec ()
Start decoding of data.
public void stopDec ()
Stop decoding of data.
public void pauseDec ()
Temporarily suspend decoding of data.
public void resumeDec ()
Restart decoding of data from current state of pause.
public void loopDec ()
This method allows user interactive decoding of a dynamic visual object as a defined sequence of static vops forming a closed loop. A similar analogy may be applicable to audio as well. User selection occurs via mouse clicks or menus.
public int selectDirec ()
Select the direction (scene orientation). A number of pre-specified directions are allowed and selection takes place by clicking a mouse on hot points on the object or via a menu.
public Mp4Stream enhanceobject (int orient)
Use selected scene orientation to obtain needed temporal auxiliary (enhancement) stream.
public void attachDecoder (Mp4Stream srcstrm, int orient)
Attach temporal auxiliary (enhancement) decoder to srcstrm in preparation to decode a valid MPEG-4 stream and specifies the selected scene direction of AV object.
public void offsetStream (Mp4Stream srcstrm, ulong offset)

Allow an offset into the srcstrm as the target where the decoding may start. In reality, the actual target location may be beyond the required target and depends on the location of valid entry point in the stream.

Trick Mode API

Trick Mode API supports conditional decoding under user control to permit enhanced trick play capabilities. Enhanced trick play can be conceived as enabling of VCR/CDPlayer like functions such as different speeds for FF or FR, Freeze Frame, Random Access as well others such as reverse play etc, however with the difference that MPEG-4 can allow these capabilities on individual AV object basis in addition to that on composited full scene basis.

Class mpgj.func.TrickAVObject
public class TrickAVObject
extends BaseAVObject

TrickAVObject is a class that can be used to form objects that allow decoding suitable for trick play.

Constructors
public TrickAVObject()
Methods
public void startDec ()
Start decoding of data.
public void stopDec ()
Stop decoding of data.
public void pauseDec ()
Temporarily suspend decoding of data.
public void resumeDec ()
Restart decoding of data from current state of pause.
public void loopDec ()
This allows user interactive decoding of selected portions of the srcstream for forward or reverse playback at a variety of speeds.
public boolean selectDirec ()
Select the direction of decoding. Returns true when trick decoding is done in (normal) forward direction, else it returns false when reverse direction for trick decoding is selected.
public Mp4Stream enhanceObject (boolean decdirec)
Obtain the MPEG-4 stream to be decoded in direction specified by decdirec
public void attachDecoder (Mp4Stream srcstrm, int decdirec)
Attach trick decoder to srcstrm in preparation to decode a valid trick mode MPEG-4 stream and specifies the direction of decoding.
public void offsetStream (Mp4Stream srcstrm, ulong offset)
Allow an offset into the srcstrm as the target where the decoding may start. In reality, the actual target location may be beyond the required target and depends on the location of valid entry point in the stream.

Transparency API

Transparency API supports selective decoding of regions of an object under user control. In the case of visual objects, it is assumed that encoding is done in a manner where a large object is segmented into a few smaller regions by changing the transparency of other pixels in the object. The pixels not belonging to region of interest are coded by assigning them a selected key color not present in the region being coded. This API allows decoding under user control such that a few or all of the regions may be coded. Further, for a region of interest, enhancement bitstream may be requested to improve the spatial or temporal quality. The key color for each region is identified to compositor. The user may not need to decode all regions either due to limited bandwidth/ computing resources, portions of object being hidden and are thus not needed, or a much higher quality being needed for a specific region at the cost of no image or poor image in other regions. The process of using a key color is similar to "chroma key" technique in broadcast applications.

Class mpgj.svs.TranspAVObject
public class TranspAVObject
extends BaseAVObject

TranspAVObject is a class that can be used to form objects with transparency information. Both aural and visual object types are handled.

Constructors
public TranspAvObject ()
Methods
public void startDec ()
Start decoding of data.
public void stopDec ()
Stop decoding of data.
public void pauseDec ()
Temporarily suspend decoding of data.
public void resumeDec ()
Restart decoding of data from current state of pause.
public int getRegion ()
Select the region by number in a listed menu or by clicking on hotpoints (also translates to a number).
public Mp4Stream enhanceObject (int type, int regnum)
Use selected enhancement type to obtain needed enhancement stream for the region regnum.
public void attachDecoder (Mp4Stream srcstrm, int type, int regnum)
Attach decoder to srcstrm in preparation to decode a region and its key color.
public void offsetstream (Mp4Stream srcstrm, ulong offset)
Allow an offset into the srcstrm as the target where the decoding may start. In practice, the actual target location may be beyond the required target and depends on the location of valid entry point in the stream.

Figure 5:
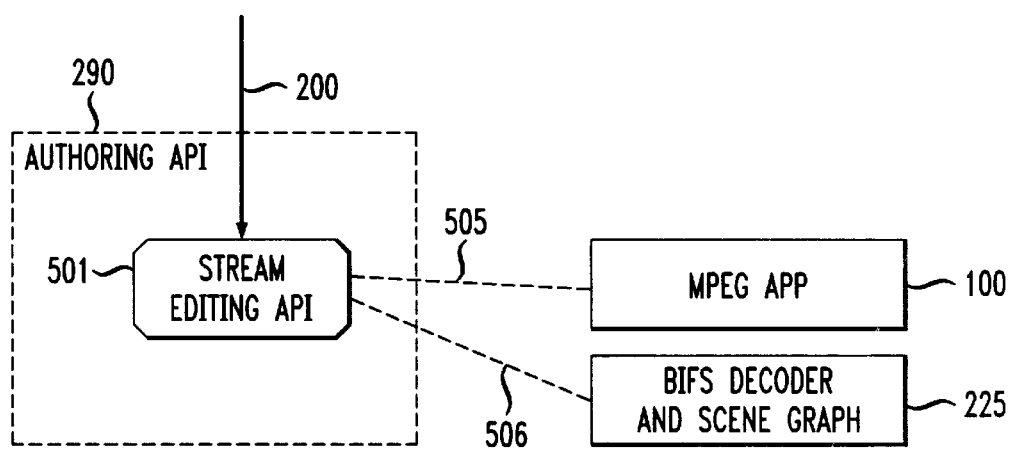
FIG. 5 illustrates an interface method for authoring according to the invention.

FIG. 5 illustrates the authoring aspects of the invention using an example of stream editing for which an interface is defined in terms of another category of API. The Authoring API 290 represents authoring-related interfaces, more specifically, Stream Editing API (501). Using the API it is possible to edit/modify bitstreams for use by MPEG App (100) or BIFS Decoder and Scene Graph (225). The API 501 exerts control on MPEG APP 100 via control line 505, and on BIFS Decoder and Scene Graph 225 via control line 506. The Stream Editing API thus can help edit/modify an MPEG-4 bitstream containing various audio-visual media objects as well as the BIFS scene description. Besides Stream Editing API other API allowing authoring are also possible but are not specified by this invention. Details of the Stream Editing API are now possible.

Authoring

The following API addresses the partial authoring of MPEG-4 bitstreams.

Stream Editing API
Class mpgj.util.StreamEdit
public class StreamEdit

This class allows determination of contents as well as modification of MPEG-4 systems streams. Operations such as access, copy, add, replace, delete and others are supported.

Constructors public StreamEdit ()

Methods public int[] getObjectList(Mp4Stream srcstrm)

Returns the list of objects in the srcstrm. The returned object is the cumulative table of objects in the bitstream.

public boolean replaceIbject (Mp4Stream srcstrm, ulong srcobjid, Mp4Stream deststrm, ulong destobjid)

Replaces the occurrence of objects with object id destobjid in deststrm with corresponding occurrences of object with object id srcobjid in the srcstrm. The object tables are updated accordingly. The operation returns true on successful replace whereas false indicates a failure to replace.

public boolean replaceObjectAt (Mp4Stream srcstrm, ulong srcobjid, ulong m, Mp4Stream deststrm, ulong destobjid, ulong n)

Same semantics as replaceObject(), except that the position to start to replace is specified. Replaces the destination object from nth occurrences of destobjid with source objects from the mth occurrence of srcobjid. For m=n=0, it performs identically to replaceObject().

public boolean containsObjectType (MP4Stream srcstrm, ulong objtype)

Returns true if srcstrm contains an object of objtype, else returns false.

public boolean addObjects (Mp4Stream srcstrm, ulong srcobjId, Mp4Stream deststrm)

Adds objects of srcobjid from srcstrm to deststrm. Returns true if successful, else returns false.

public boolean addObjectsAt (Mp4Stream srcstrm, ulong srcobjid, Mp4Stream deststrm, ulong destobjid, ulong n)

Adds objects of srcobjid from srcstrm to deststrm starting after nth occurrence of destobjid. Returns true if successful, else returns false.

public boolean copyObjects (Mp4Stream srcstrm, ulong srcobjid, Mp4Stream deststream, destobjid)

Copies objects with srcobjid in srcstrm to deststream with new object id, destobjid. If deststrm does not exist, it is created. If it exists it is overwritten. This operation can be used to create elementary stream objects from multiplexed streams for subsequent operations. Returns true if successful, else returns false.

public boolean deleteObjects (Mp4Stream deststrm, ulong destobjid)

Delete all objects with destobjid in deststrm. Also remove all composition information. Returns true if successful, else returns false.

public boolean spliceAt (Mp4Stream deststrm, ulong destobjid, ulong n, Mp4Stream srcstrm)

Splice deststrm after nth occurrence of destobjid and paste the srcstrm. Returns true if successful, else returns false.

Collectively, the flexible system and method including the set of library functions reflected in the APIs of FIGS. 1 through 5 provide a new level of adaptivity allowing matching of coded media streams to decoding terminal resources, such as remote laptop PCs or other devices. In addition, the inventions also includes support for user interaction allowing advanced new functions in conjunction with appropriate decoders as well as selective decoding of coded media object bitstreams.

In the implementation of the invention, categories including defined AV-related Functionalities are introduced, and API set is established to enable simpler as well as more complicated interactions between decoding and composition of embedded audiovisual objects, all in a universal and consistent manner.

The foregoing description of the system and method of the invention is illustrative, and variations in construction and implementation will occur to persons skilled in the art. For instance, while a compact and universal set of input, output and mapping functions in three categories have been described, functions can be added or subtracted from the API set according to changing network, application or other needs. The scope of the invention is intended to be limited only by the following claims.

What is claimed is:

1. A system for decoding audiovisual objects coded according to the MPEG-4 standard, comprising:

an interface library containing a predetermined set of standardized application programming interfaces for processing audiovisual objects, each of the standardized programming interfaces having predefined function calls;

a processor, configured to access the interface library, and to decode and present audiovisual objects according to function calls related to at least one of the application programming interfaces.

2. The system of claim 1, wherein the processor unit executes a client application invoking the function calls.

3. The system of claim 1, further comprising a user input unit, the system being responsive to a state of decoding, playback or browsing system resources and to user interaction provided through the user input unit.

4. The system of claim 1, wherein the interface library comprises a visual decoding interface to decode visual object bitstreams.

5. The system of claim 1, wherein the interface library comprises a functionality interface to provide enhanced user interaction.

6. The system of claim 1, wherein the interface library comprises an authoring interface providing bitstream editing and manipulation capabilities.

7. An operating system using the system of claim 1 to provide visual, functionality and authoring interfaces using the interface library.

8. The system of claim 1, further comprising a video decode and playback unit supporting the interface library.

9. The system of claim 1, further comprising a multimedia browser module employing the interface library for user viewing.

10. The system of claim 1, further comprising a multimedia plug-in module called from a web browser employing the interface library.

11. A method for decoding audiovisual objects coded according to the MPEG-4 standard, comprising the steps of:

generating an interface library, the interface library comprising a predetermined set of standarized application programming interfaces;

accessing the audiovisual objects using variables related to at least one of the set of interface definitions in the interface library; and decoding the audiovisual objects represented by the variables.

12. The method of claim 11, further comprising the step of executing a client application, the client application forming an adaptive system controlling an underlying MPEG-4 decoding system.

13. The method of claim 11, further comprising the step of providing a user input, the interfacing being responsive to a state of decoding, playback, or browsing system resources and to user interaction provided through the user input unit.

14. The method of claim 11, wherein the interface library comprises a visual decoding interface to decode visual object bitstreams.

15. The method of claim 11, wherein the interface library comprises a functionality interface to provide enhanced user interaction.

16. The method of claim 11, wherein the interface library comprises an authorizing interface providing bitstream editing and manipulation capabilities.

17. The method of claim 11, further comprising the step of providing an operating system using visual, functionality and authoring interfaces to a user using the interface library.

18. The method of claim 11, further comprising the step of decoding and playing back video information using the interface library.

19. The method of claim 11, further comprising the step of providing a multimedia browser employing the interface library.

20. The method of claim 11, further comprising the step of providing a multimedia plug-in called from a web browser employing the interface library.

* * * * *